(12) United States Patent
Suzuki

(10) Patent No.: US 10,768,876 B2
(45) Date of Patent: Sep. 8, 2020

(54) DISPLAY DEVICE, IMAGE PROCESSING APPARATUS, AND NON-TRANSITORY COMPUTER READABLE MEDIUM WITH CHANGING PROCESS ACTION INTERFACE BASED ON PROCESS OBJECT SELECTION

(71) Applicant: FUJI XEROX CO., LTD., Tokyo (JP)

(72) Inventor: Takayuki Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/388,932

(22) Filed: Apr. 19, 2019

(65) Prior Publication Data
US 2020/0125302 A1  Apr. 23, 2020

(30) Foreign Application Priority Data

Oct. 18, 2018 (JP) .................................. 2018-196855

(51) Int. Cl.
*G06F 3/12* (2006.01)

(52) U.S. Cl.
CPC ............ *G06F 3/126* (2013.01); *G06F 3/1205* (2013.01)

(58) Field of Classification Search
None
See application file for complete search history.

(56) References Cited

U.S. PATENT DOCUMENTS

2007/0165248 A1* 7/2007 Utsunomiya ......... G06F 3/1208
358/1.1
2016/0094737 A1* 3/2016 Sugiura .............. H04N 1/00432
358/1.15

FOREIGN PATENT DOCUMENTS

JP         S59-058457 U    4/1984
JP         2005-064944 A   3/2005

* cited by examiner

*Primary Examiner* — Thomas D Lee
(74) *Attorney, Agent, or Firm* — Oliff PLC

(57) ABSTRACT

A display device includes a process-action display section, a process-object display section, a process-object selection section, and a display controller. The process-action display section displays a process action, the process-object display section displays one or more process objects on which the process action displayed by the process-action display section is to be performed, the process-object selection section makes a selection from the one or more process objects displayed by the process-object display section, and the display controller performs control to display a different process action in the same display region of the process-action display section when the selection made from the one or more process objects is different, the selection being made by the process-object selection section.

15 Claims, 4 Drawing Sheets

DISPLAY DEVICE, IMAGE PROCESSING APPARATUS, AND NON-TRANSITORY COMPUTER READABLE MEDIUM WITH CHANGING PROCESS ACTION INTERFACE BASED ON PROCESS OBJECT SELECTION

CROSS-REFERENCE TO RELATED APPLICATIONS

This application is based on and claims priority under 35 USC 119 from Japanese Patent Application No. 2018-196855 filed Oct. 18, 2018.

BACKGROUND

(i) Technical Field

The present disclosure relates to a display device, an image processing apparatus, and a non-transitory computer readable medium.

(ii) Related Art

Japanese Utility Model Gazette No. 59-58457 discloses a copying apparatus configured to start copying in response to the operation of a copy start switch and to abort copying in response to the operation of a copy stop switch, the copy start switch being used as the copy stop switch only during a copying process, thereby enabling a single operation switch to serve as the copy start switch and the copy stop switch.

Japanese Unexamined Patent Application Publication No. 2005-64944 discloses an image scanning system that causes a scanner to display an additional scanning start button that replaces a scanning start button and that is used for starting an additional scan.

SUMMARY

Aspects of a non-limiting embodiment of the present disclosure relate to providing a display device, an image processing apparatus, and a non-transitory computer readable medium, and the display device displays process actions in a limited display region instead of displaying process actions in a plurality of display regions for different selections made from one or more process objects on which the process actions are to be performed.

Aspects of a certain non-limiting embodiment of the present disclosure address the features discussed above and/or other features not described above. However, aspects of the non-limiting embodiment are not required to address the above features, and aspects of the non-limiting embodiment of the present disclosure may not address features described above.

According to an aspect of the present disclosure, there is provided a display device including a process-action display section that displays a process action, a process-object display section that displays one or more process objects on which the process action displayed by the process-action display section is to be performed, a process-object selection section that makes a selection from the one or more process objects displayed by the process-object display section, and a display controller that performs control to display a different process action in the same display region of the process-action display section when the selection made from the one or more process objects is different, the selection being made by the process-object selection section.

BRIEF DESCRIPTION OF THE DRAWINGS

An exemplary embodiment of the present disclosure will be described in detail based on the following figures, wherein.

DETAILED DESCRIPTION

Figure 1:
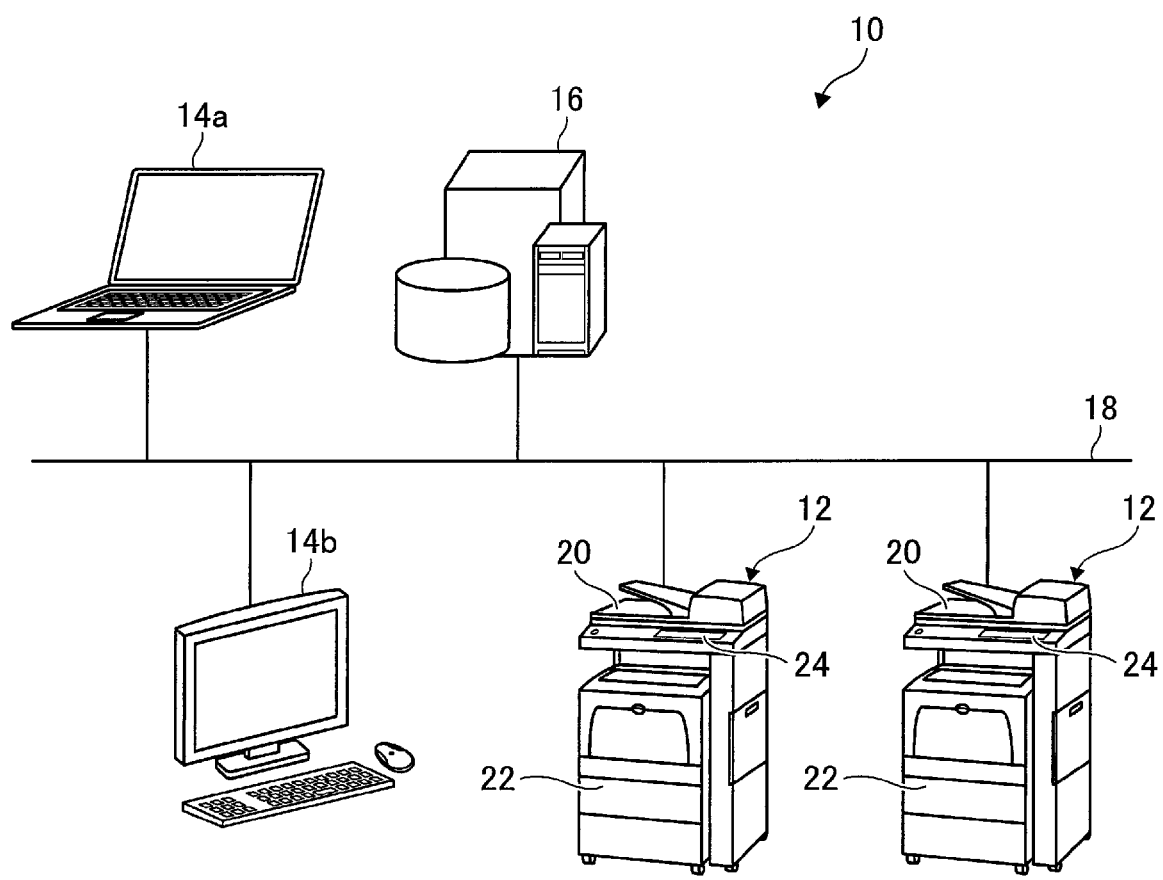
FIG. 1 illustrates an image processing system including image processing apparatuses according to the exemplary embodiment of the present disclosure.

An exemplary embodiment of the present disclosure will be described in detail with reference to the drawings. FIG. 1 illustrates the whole of an image processing system 10 including image processing apparatuses 12 according to the exemplary embodiment of the present disclosure.

The image processing system 10 includes, for example, a plurality of image processing apparatuses 12, a plurality of personal computers 14a and 14b, and a server 16. The plurality of image processing apparatuses 12, the plurality of personal computers 14a and 14b, and the server 16 are connected to each other via a network 18. The network 18 may be a local area network or the Internet. Each of the image processing apparatuses 12 includes an image scanning unit 20, an image forming unit 22, and a display-and-operation device 24 and is a so-called multifunction peripheral, which has functions such as an image scanning function, a printing function, and a facsimile function.

The server 16 stores, for example, document data specified by the personal computers 14a and 14b for printing and document data scanned by the image processing apparatuses 12. The server 16 may also manage authentication information items such as a username, user identification (ID) string, and password assigned to a user who uses the image processing apparatuses 12 and the personal computers 14a and 14b. Alternatively, for performing user authentication, an authentication server may be provided separately from the server 16.

The display-and-operation device 24 is constituted by combining, for example, a liquid crystal display and a touch panel, and a user can operate each of the image processing apparatuses 12 by pushing operation buttons displayed by the display-and-operation device 24.

Figure 2:
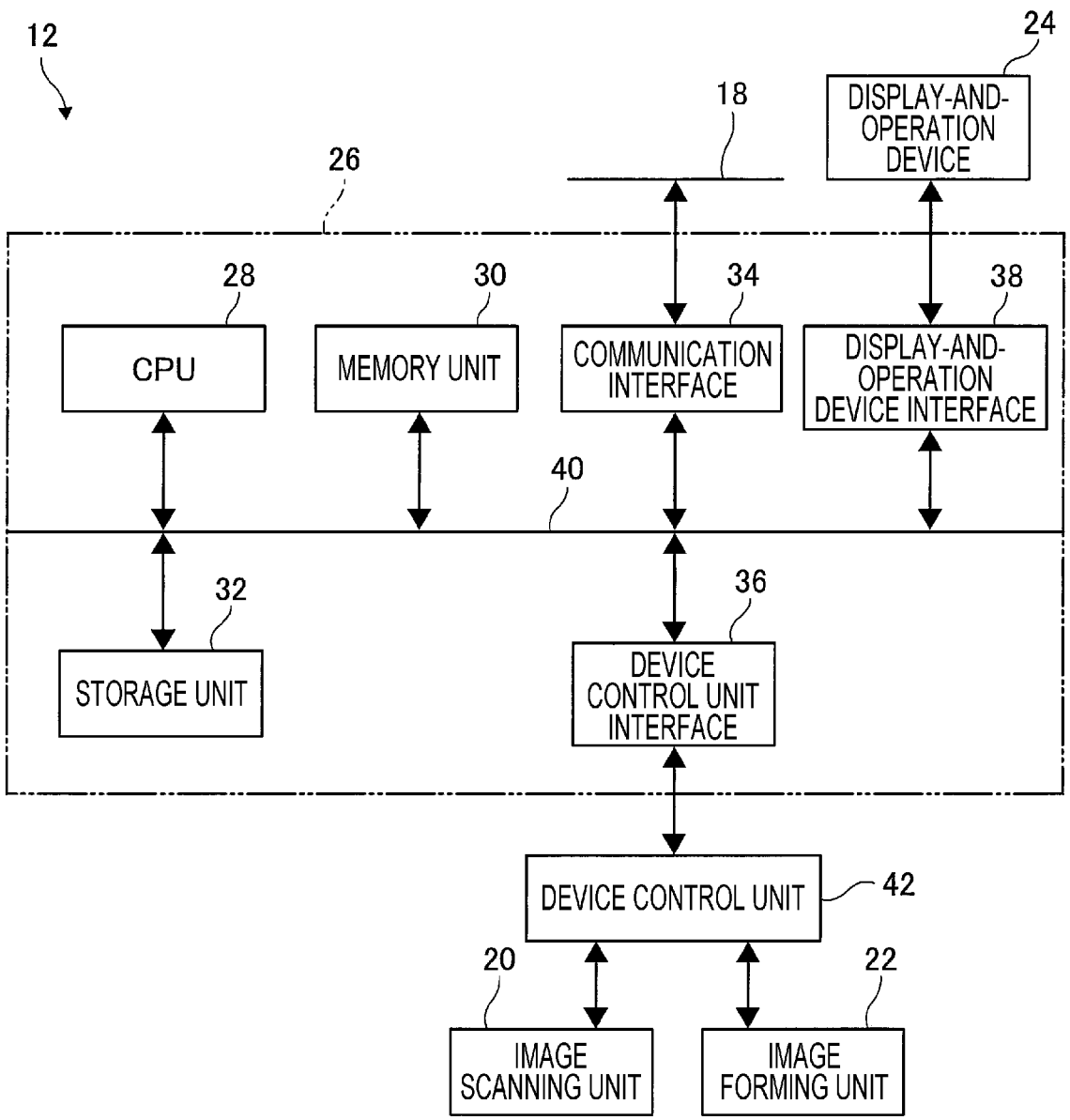
FIG. 2 is a block diagram illustrating a hardware configuration of each of the image processing apparatuses according to the exemplary embodiment of the present disclosure.

FIG. 2 is a block diagram illustrating a hardware configuration of each of the image processing apparatuses 12. Each of the image processing apparatuses 12 includes a main control unit 26, and the main control unit 26 includes a central processing unit (CPU) 28, a memory unit 30, a storage unit 32, a communication interface 34, a device control unit interface 36, and a display-and-operation device interface 38. The CPU 28, the memory unit 30, the storage unit 32, the communication interface 34, the device control unit interface 36, and the display-and-operation device interface 38 are connected to each other via a bus 40.

The CPU 28 performs predetermined processing in accordance with a control program stored in the memory unit 30. The storage unit 32 is constituted by, for example, a hard disk and stores software and data needed for operation. The communication interface 34, which is connected to the network 18 described above, inputs and outputs data via the network 18.

A device control unit 42 is connected to the device control unit interface 36. The device control unit 42 is connected to the image scanning unit 20 and the image forming unit 22 described above and is configured to control the image scanning unit 20 and the image forming unit 22. The display-and-operation device 24 described above is connected to the display-and-operation device interface 38.

When a user intends to print a document by using the personal computer 14a or 14b, the user provides instructions to print the document by using application software in the personal computer 14a or 14b. Then, a printer driver is activated, sets parameters such as the print area, the size and orientation of a print medium, the number of prints, and the selection between monochrome and color, and sends the parameters to the server 16 to register a job in the server 16. A job indicates an object that may be processed, or a process object, and indicates an object that may be printed when printing is to be performed. Thus, once a job is registered in the server 16, any of the image processing apparatuses 12 can read and print the job registered in the server 16. The jobs include not only documents produced by using the personal computers 14a and 14b but also documents that are stored in a smartphone or a tablet and that are registered in the server 16, documents obtained from external databases, and the like.

Figure 3:
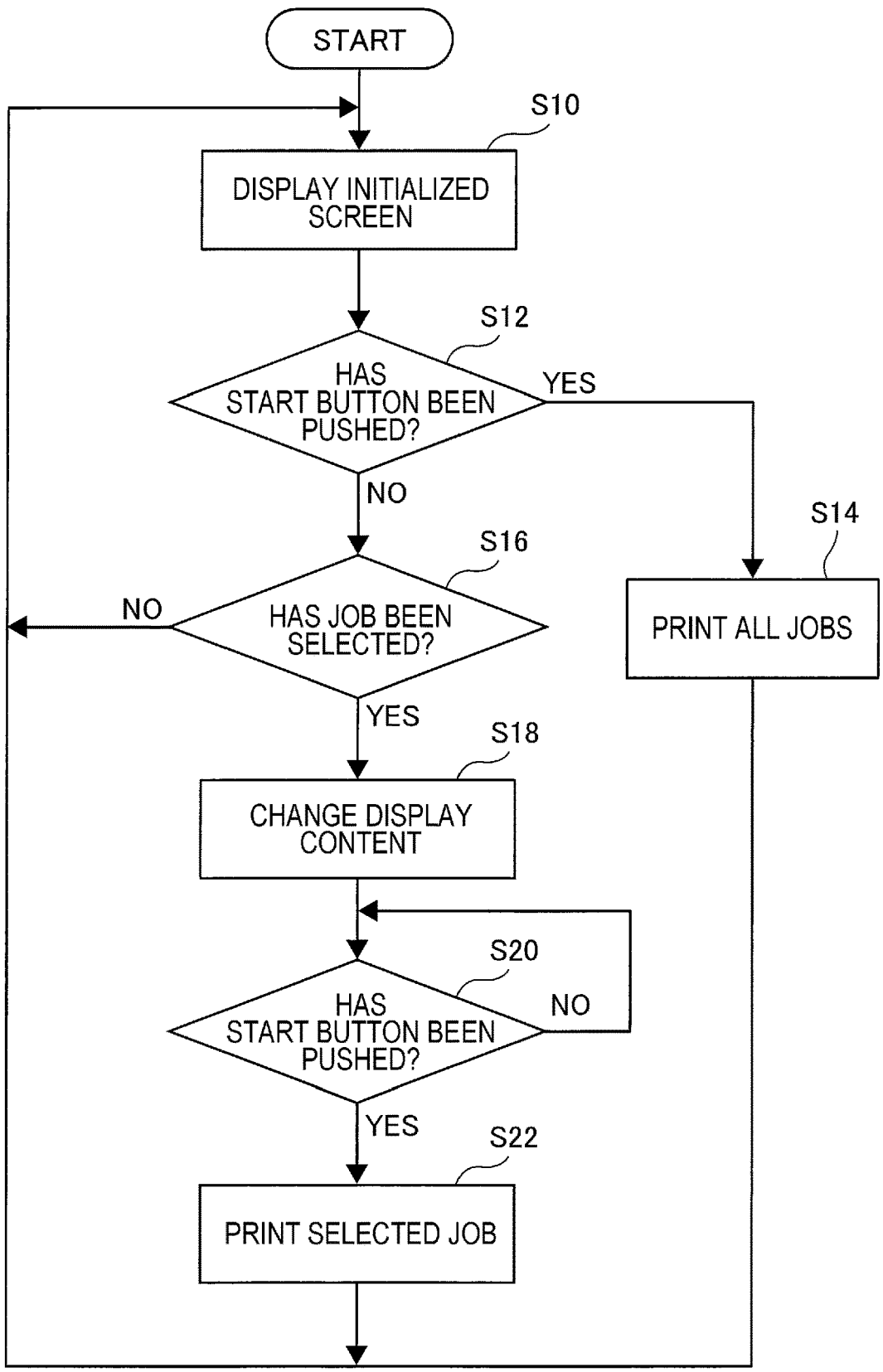
FIG. 3 is a flowchart illustrating the operation flow of each of the image processing apparatuses according to the exemplary embodiment of the present disclosure.

FIG. 3 is a flowchart illustrating the operation flow of each of the image processing apparatuses 12.

Figure 4A:
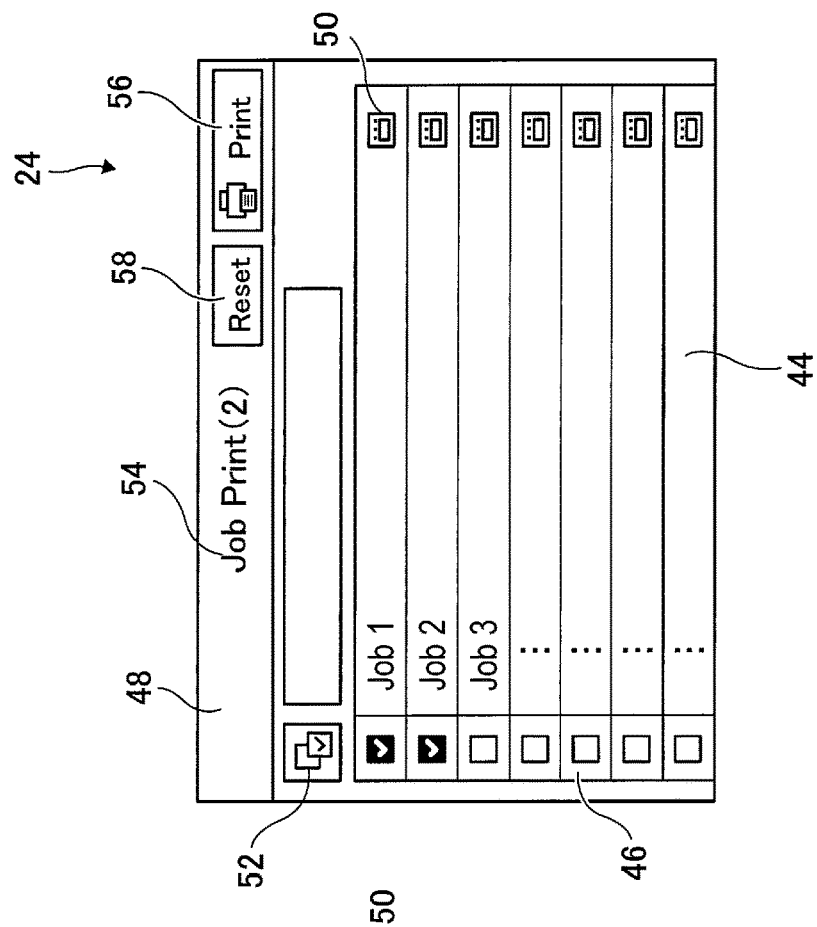
FIGS. 4A and 4B illustrate display screens displayed by a display-and-operation device in each of the image processing apparatuses according to the exemplary embodiment of the present disclosure, FIG. 4A illustrating the initialized display screen and FIG. 4B illustrating a display screen displayed when jobs have been selected.

First, in step S10, the display screen of the display-and-operation device 24 is initialized. The initialized display screen is divided into a process-object display section 44, a process-object selection section 46, and a process-action display section 48, as illustrated in FIG. 4A. The process-object display section 44 displays a job registered by an authenticated user as an object that may be processed, or a process object. The jobs may be displayed in order of date and time of registration or the number of prints. In this example, seven jobs are displayed vertically, and more jobs can be displayed by scrolling down the screen. The process-object display section 44 also provides detail display buttons 50. If a user pushes one of the detail display buttons 50, detailed information about the corresponding job, such as the print area, the size and orientation of a print medium, the number of prints, and the selection between monochrome and color, is displayed.

The process-object selection section 46 displays, for example, a checkbox next to each of the jobs displayed in the process-object display section 44. When no job is selected, all the checkboxes in the process-object selection section 46 are displayed in white. On the other hand, when a job is selected, the checkbox in the process-object selection section 46 that corresponds to the job turns black and is checked (see FIG. 4B). The process-object selection section 46 also provides a select-all button 52, which is used to select all the jobs. When the select-all button 52 is pushed, all the jobs are selected, and the corresponding checkboxes are checked. On the other hand, when the select-all button 52 is pushed while all the jobs are selected, all the jobs become unselected.

Figure 4B:
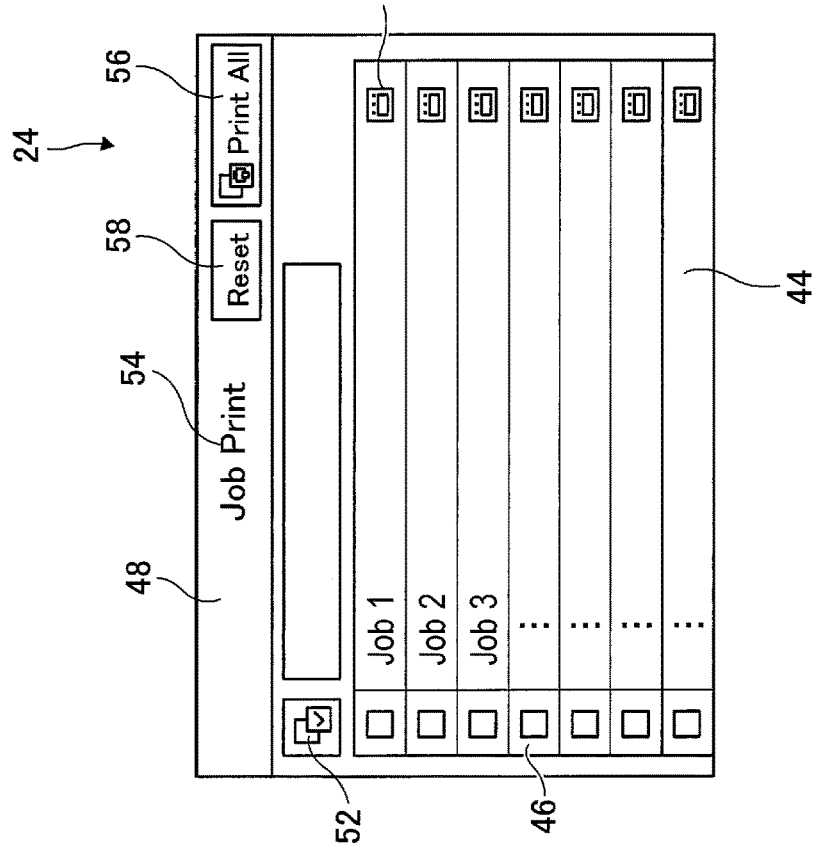

The process-action display section 48 includes a first display section 54 and a second display section 56. The first display section 54 is located in the central portion of the process-action display section 48. When no job is selected in the process-object selection section 46, for example, the phrase "Job Print" is displayed in the first display section 54. When, for example, two jobs are selected in the process-object selection section 46, the phrase "Job Print (2)" is displayed, as illustrated in FIG. 4B, indicating that two jobs have been selected.

The second display section 56 is located in the top right-hand corner of the screen. The second display section 56 also serves as a start button, which is a process execution instruction section. When no job is selected in the process-object selection section 46, the phrase "Print All" is displayed, indicating that printing is performed for all the jobs if the start button is pushed without changing the current settings. On the other hand, when at least one job is selected in the process-object selection section 46, the phrase "Print" is displayed, indicating that printing is performed for the at least one job selected in the process-object selection section 46 if the start button is pushed without changing the current settings. Thus, the phrases "Print All" and "Print" are displayed in the same display region. A reset button 58 is provided in the process-action display section 48, and pushing the reset button 58 clears the items that have been selected.

Referring back to FIG. 3, after the initial screen is displayed in step S10, the process proceeds to step S12, and it is determined whether the start button has been pushed. When it is determined in step S12 that the start button has been pushed, the process proceeds to step S14, and printing is performed for all the jobs. On the other hand, when it is determined in step S12 that the start button has not been pushed, the process proceeds to step S16.

In step S16, it is determined whether at least one of the jobs has been selected in the process-object selection section 46. When it is determined in step S16 that no job has been selected, the process returns to step S10, and the initial screen is kept displayed. On the other hand, when it is determined in step S16 that at least one of the jobs has been selected, the process proceeds to step S18, and the display content of the process-action display section 48 is changed. Specifically, the phrase "Job Print" displayed in the first display section 54, which is illustrated in FIG. 4A, is changed to the phrase "Job Print (#)", where # is the number of the at least one selected job, which is illustrated in FIG. 4B, and the phrase "Print All" displayed in the second display section 56, which is illustrated in FIG. 4A, is changed to the phrase "Print", which is illustrated in FIG. 4B. Although the phrase "Job Print (#)", where # is the number of the at least one selected job, is displayed when at least one of the jobs is selected in the process-object selection section 46, the phrase "Print (#)", where # is the number of the at least one selected job, may be displayed in the second display section 56, or the display of the number of the at least one selected job in parentheses may be omitted in the first display section 54 and in the second display section 56.

Next, in step S20, it is determined whether the start button has been pushed. When it is determined in step S20 that the start button has not been pushed, the process repeats the processing in step S20 and waits for the start button to be pushed. On the other hand, when it is determined in step S20 that the start button has been pushed, the process proceeds to step S22, and printing is performed for the at least one selected job.

When the processing in step S14 or in step S22 described above finishes, the process returns to step S10, and the initial screen is displayed.

In the exemplary embodiment described above, the display-and-operation device 24 is described as a device having both a display function and an operation function. However, the display-and-operation device 24 may be a display device having only a display function. For example, the start button may be disposed in a different unit and may be connected to the display device by using wiring. Alternatively, a pointing device such as a mouse, which is disposed separately from the display device, may be connected for selecting a job.

Further, although a display device for controlling an image forming unit has been described in the exemplary embodiment, the present disclosure may be applied to a display device for controlling other image processing units, such as an image scanning unit. For example, a plurality of files that can store an image that has been scanned may be displayed instead of the jobs displayed in the process-object display section 44. When no file is selected, the phrase "Pre-Scan" may be displayed in the process-action display section 48 as a process action. When the "Pre-Scan" button is pushed, a pre-scan image of the image that has been scanned may be displayed, whereas, when one of the files is selected, the phrase "Scan" may be displayed in the process-action display section 48 as a process action, and the image that has been scanned may be stored in the selected file. Further, as another exemplary embodiment, thumbnail images of a plurality of images that have been scanned may be displayed instead of the jobs displayed in the process-object display section 44. When no thumbnail image is selected, the phrase "Scan All" may be displayed, and all the images that have been scanned may be stored in a file, whereas, when at least one of the images is selected, the phrase "Scan" may be displayed, and only the at least one selected image may be stored in a file.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display device comprising:
   a process-action display section that displays
      a process action, and
      an execution command which, if activated, starts execution of the process action on a selected object;
   a process-object display section that displays one or more process objects on which the process action displayed by the process-action display section is to be performed;
   a process-object selection section that makes a selection from the one or more process objects displayed by the process-object display section; and
   a display controller that
      performs control to change the display of the process action in the same display region of the process-action display section when the selection made by the process-object selection section changes, and
      performs control to change the display of the execution command when no process object is selected from when at least one process object is selected.

2. The display device according to claim 1, wherein when none of the one or more process objects has been selected by the process-object selection section, the display controller performs control to display a process action indicating that all of the one or more process objects are processed.

3. The display device according to claim 2, wherein the process-object selection section also serves as a process-object selection receiving section that receives a process-object selection.

4. The display device according to claim 3, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object selected.

5. The display device according to claim 2, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object, selected.

6. The display device according to claim 1, wherein the display controller performs control to display a process action that differs for the case where all of the one or more process objects have been selected by the process-object selection section and for the case where at least one of the one or more process objects has not been selected by the process-object selection section.

7. The display device according to claim 6, wherein the process-object selection section also serves as a process-object selection receiving section that receives a process-object selection.

8. The display device according to claim 7, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object selected.

9. The display device according to claim 6, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object selected.

10. The display device according to claim 1, wherein
the process-object selection section also serves as a process-object selection receiving section that receives a process-object selection.

11. The display device according to claim 10, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object selected.

12. The display device according to claim 1, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object selected.

13. An image processing apparatus comprising:
an image processing execution unit that performs image processing; and
a display device that displays a process action to be performed by the image processing execution unit, the display device including:
  a process-action display section that displays
    a process action, and
    an execution command which, if activated, starts execution of the process action on a selected object;
  a process-object display section that displays one or more process objects on which the process action displayed by the process-action display section is to be performed;
  a process-object selection section that makes a selection from the one or more process objects displayed by the process-object display section: and
  a display controller that
    performs control to change the display of the process action in the same display region of the process-action display section when the selection made by the process-object selection section changes, and
    performs control to change the display of the execution command when no process object is selected from when at least one process object is selected.

14. The image processing apparatus according to claim 13, wherein:
when no process object is selected, the execution command is displayed to indicate that, if activated, starts execution of the process action on all of the one or more objects displayed by the process-object display section, and
when at least one process object is selected, the execution command is displayed so that, if activated, starts execution of the process action on the at least one process object selected.

15. A non-transitory computer readable medium storing a program causing a computer to execute a process for display, the process comprising:
displaying a process action and an execution command which, if activated, starts execution of the process action on a selected object;
displaying one or more process objects on which the displayed process action is to be performed;
making a selection from the one or more displayed process objects:
performing control to change the display of the process action in the same display region when the selection made from the one or more process objects changes; and
performing control to change the display of the execution command when no process object is selected from when at least one process object is selected.

* * * * *